United States Patent [19]
Hutsell et al.

[11] Patent Number: 5,491,395
[45] Date of Patent: Feb. 13, 1996

[54] TUT SERVO IC ARCHITECTURE

[75] Inventors: Larry Hutsell; Curt Bruner; Jeff Reh; Glenn Albert, all of Longmont, Colo.

[73] Assignee: Maxtor Corporation, Longmont, Colo.

[21] Appl. No.: 123,325

[22] Filed: Sep. 17, 1993

[51] Int. Cl.$^6$ .................................................. G11B 21/02
[52] U.S. Cl. ........................ 318/560; 318/561; 360/69; 360/70; 360/78.04
[58] Field of Search .................................. 318/560–646; 360/70–89, 69; 310/49 R; 371/37.1, 37.5, 38.1, 39.1, 40

[56] References Cited

U.S. PATENT DOCUMENTS

| | | | |
|---|---|---|---|
| Re. 32,075 | 1/1986 | Harrison et al. | 360/77 |
| 4,396,959 | 8/1983 | Harrison et al. | 360/77 |
| 4,419,701 | 12/1983 | Harrison et al. | 360/77 |
| 4,660,106 | 4/1987 | Harrison et al. | 360/77 |
| 4,814,909 | 3/1989 | Brown et al. | 360/78.07 |
| 4,872,074 | 10/1989 | Brown et al. | 360/77.07 |
| 4,920,434 | 4/1990 | Brown et al. | 360/77.08 |
| 4,933,785 | 6/1990 | Morehouse et al. | 360/78.04 |
| 4,979,056 | 12/1990 | Squires et al. | 360/69 |
| 4,982,296 | 1/1991 | Brown et al. | 360/77.03 |
| 5,025,335 | 6/1991 | Stefansky | 360/97.01 |
| 5,025,336 | 6/1991 | Morehouse et al. | 360/97.02 |
| 5,170,299 | 12/1992 | Moon | 360/77.08 |
| 5,218,496 | 6/1993 | Kaczeus | 360/106 |
| 5,241,546 | 8/1993 | Peterson et al. | 371/37.1 |
| 5,255,136 | 10/1993 | Machado et al. | 360/77.02 |
| 5,291,110 | 3/1994 | Andrews, Jr. et al. | 318/560 |
| 5,345,347 | 9/1994 | Hopkins et al. | 360/71 |

*Primary Examiner*—Paul Ip
*Attorney, Agent, or Firm*—Sheridan, Ross & McIntosh

[57] ABSTRACT

An integrated servo circuit that controls the spin motor and voice coil motor of a hard disk drive in response to digital commands that are generated by a microprocessor based controller chip. The servo chip contains a spin motor control circuit and a voice coil control circuit that control the speed of the spin motor and the position of the actuator arm, respectively. The spin motor and voice coil motor control circuits are coupled to a digital to analog converter which converts the digital commands from the controller chip into analog control signals which are utilized to control the spin motor and voice coil motor. Additionally, the servo chip has an analog to digital converter to convert analog signals, such as the servo burst signals, to digital bit strings that relayed to the controller chip. The controller chip and servo chip communicate through a 16 bit synchronous serial port.

37 Claims, 14 Drawing Sheets

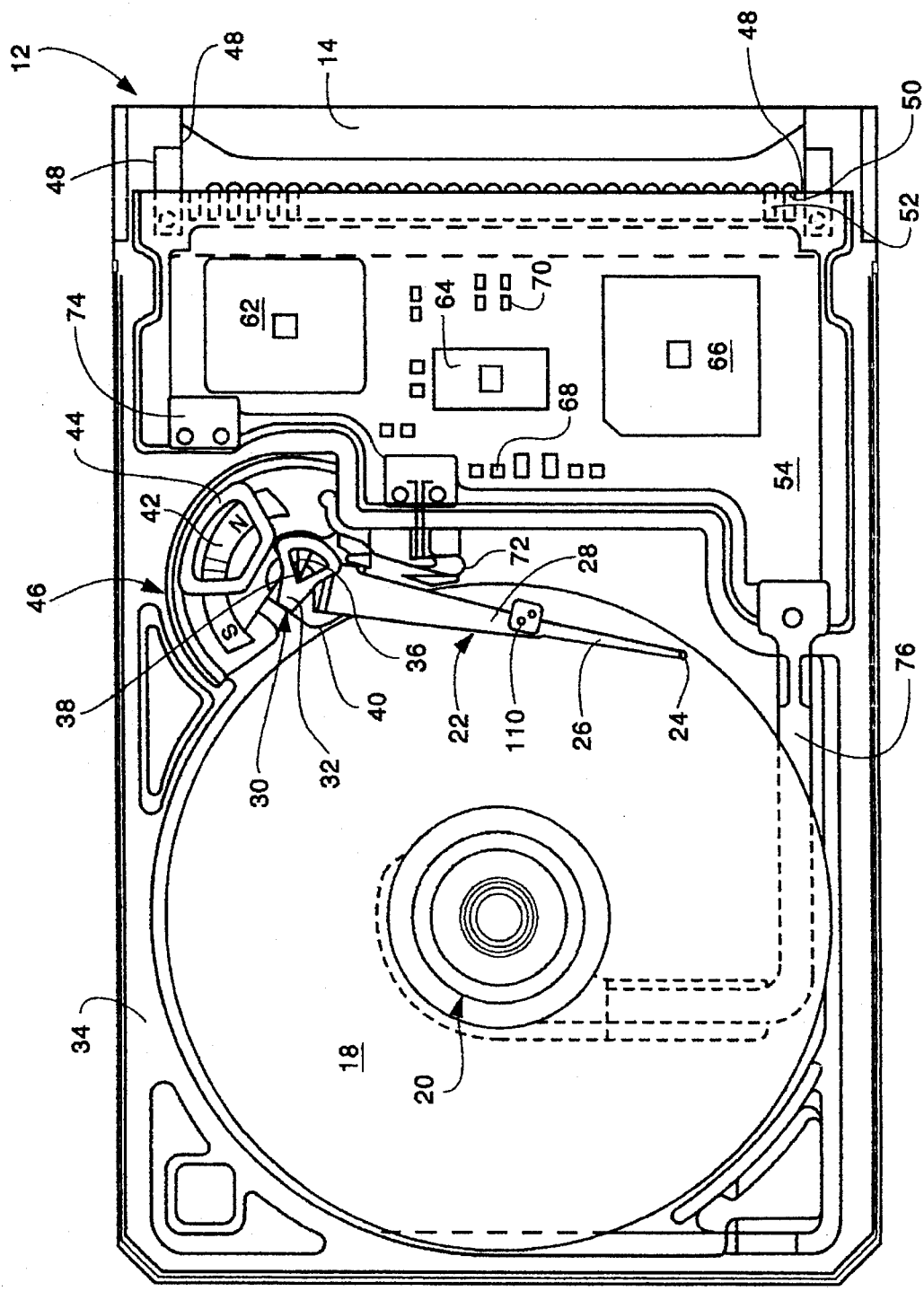

TUT SERVO IC ARCHITECTURE

BACKGROUND OF THE INVENTION

1. Field of the Invention

The present invention relates to an integrated servo circuit which controls the spin motor and voice coil motor of a hard disk drive in response to digital commands generated by a microprocessor based controller chip.

2. Description of the Related Art

Most computer systems contain a massive memory storage device such as a hard disk drive. Hard disk drive units include a magnetic disk that is capable of storing a large amount of binary information. The magnetic disk is typically coupled to a hub that is rotated by an electric motor, commonly referred to as a spin motor. The drive unit also has a head that magnetizes and senses the magnetic field of the disk. The head is typically located at the end of a cantilevered actuator arm which can pivot about a bearing assembly mounted to the base plate of the disk drive. The actuator arm has a coil which cooperates with a magnet mounted to the base plate. Providing a current to the coil creates a torque on the arm and moves the head relative to the disk. The coil and magnet are commonly referred to as a voice coil motor or VCM. The actuator arm, motors and other components of a typical disk drive unit are relatively small and fragile, and are therefore susceptible to damage when subjected to excessive external shock loads or vibration. For this reason, hard disk drives are usually rigidly mounted to the housing of the computer system by screws or other fastening means.

Hard disk drives contain programs and other information that are vital to the user. It is sometimes desirable to transfer such information to a different computer system. Transferring programs from a hard disk typically requires loading the information onto a floppy disk, or sending such information over a phone line. Such methods can be time consuming, particularly if the program is long, or there is a large amount of data. There have been developed portable hard disk drives which can be plugged into a slot in the computer. To reduce the amount of possible component damage to the drive unit, the housing and disk assembly are constructed to be quite rugged. These rugged assemblies are typically heavy and bulky, and generally impractical to carry and store.

The Personal Computer Memory Card International Association (PCMCIA) has recently promulgated specifications for portable memory cards which can be plugged into slots within a computer. The PCMCIA standard includes a type I format, a type II format and a type III format, each format being distinguished by a different card thickness. Memory can be added to a computer by merely plugging in an additional card. Similarly, a modem or facsimile (FAX) card can be added to a system with the push of the hand. The standardized format of the cards allow a user to plug the memory card of one computer into another computer, regardless of the type or make of either system.

The standardized PCMCIA cards are approximately the size of a credit card and include a connector which mates with a corresponding connector in the computer. The small size of the card provides an electronic assembly that is easy to carry and store. It is very desirable to have a hard disk drive unit which conforms with the PCMCIA format, so that the disk drive can be readily carried and plugged into an existing slot of a computer. The existence of such a card would also allow the user to accumulate memory in the same manner that floppy disk are used today.

Hard disk drive units contain a number of integrated circuits that control the operation of the drive. The circuits typically include a read/write channel that is coupled to the transducers of the actuator arm assembly. The read/write channel is connected to an interface controller which is coupled to the host computer. The interface controller is coupled to a random access memory device that is used as a buffer to store data transferred between the disk and the host.

Disk drives also contain circuitry that provide current to the voice coil to maintain the head(s) on the center of a track (servo routine) and to move the head(s) from track to track (seek routine). Additionally, a disk drive typically contains circuitry to commutate the motor, and to insure that the motor and disk rotate at a uniform speed.

The operation of the above described circuits is typically controlled by a microprocessor based controller. Conventional disk drives also contain a separate circuit which provides an interface with the controller and the other circuits. This chip is commonly referred to as glue logic. U.S. Pat. No. 4,979,056 issued to Squires et al., discloses a hard disk architecture which has a microprocessor based controller that controls the operation of the interface controller, read/write channel, actuator and spin motor circuitry. The Squires system utilizes an embedded servo format which stores the servo information in the same sector of a track as the data. During each disk sector, the processor services the voice coil and spin motor circuitry of the drive. The processor employs a hierarchy that allows the spin motor and the voice coil to be serviced in conjunction with the transfer of data between the host computer and the disk. Although a Squires type system provides a controller based system that efficiently transfers data between the disk and the host, such systems typically require a large amount of electrical components that must be mounted onto a printed circuit board.

U.S. Pat. No. 4,933,785 issued to Morehouse et al. and U.S. Pat. No. 5,025,335 issued to Stefansky et al., disclose conventional hard disk drives which have a printed circuit board mounted to a disk drive housing commonly referred to as an HDA. The HDA is typically sealed and contains the disk, actuator arm and spin motor of the assembly. The HDA may also contain a pre-amplifier that is connected to the heads of the drive. The remaining electrical components (interface controller, read/write channel, actuator circuitry, etc.) are located on the printed circuit board, external to the HDA. The circuit boards of the Morehouse and Stefansky drive units extends along the entire length and width of the HDA. Therefore the thickness of the overall assembly is defined by the thickness of the HDA, the thickness of the printed circuit board and the height of the electrical components. It would be desirable to provide an architecture which would reduce the size of the printed circuit board, so that the board and accompanying chips do not add to the thickness of the assembly.

SUMMARY OF THE INVENTION

The present invention is an integrated servo circuit that controls the spin motor and voice coil motor of a hard disk drive in response to digital commands that are generated by a microprocessor based controller chip. The servo chip contains a spin motor control circuit and a voice coil motor control circuit that control the speed of the spin motor and the position of the actuator arm, respectively. The spin motor and voice coil motor control circuits are coupled to a digital to analog converter which converts the digital commands from the controller chip into analog control signals, which are used to control the spin motor and voice coil motor. Additionally, the servo chip has an analog to digital converter to convert analog signals, such as the servo burst signals, to digital bit strings that relayed to the controller chip. The controller chip and servo chip communicate through a 16 bit synchronous serial port. The servo chip is part of an electronic architecture which can fit within a hard disk drive that meets the PCMCIA type II specifications.

It is therefore an object of the present invention to provide a servo chip that partially defines an electronic architecture that is a part of a hard disk drive that meets the PCMCIA type II specifications.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 2 is a top cross-sectional view of the hard disk drive;

DETAILED DESCRIPTION OF THE INVENTION

Figure 1:
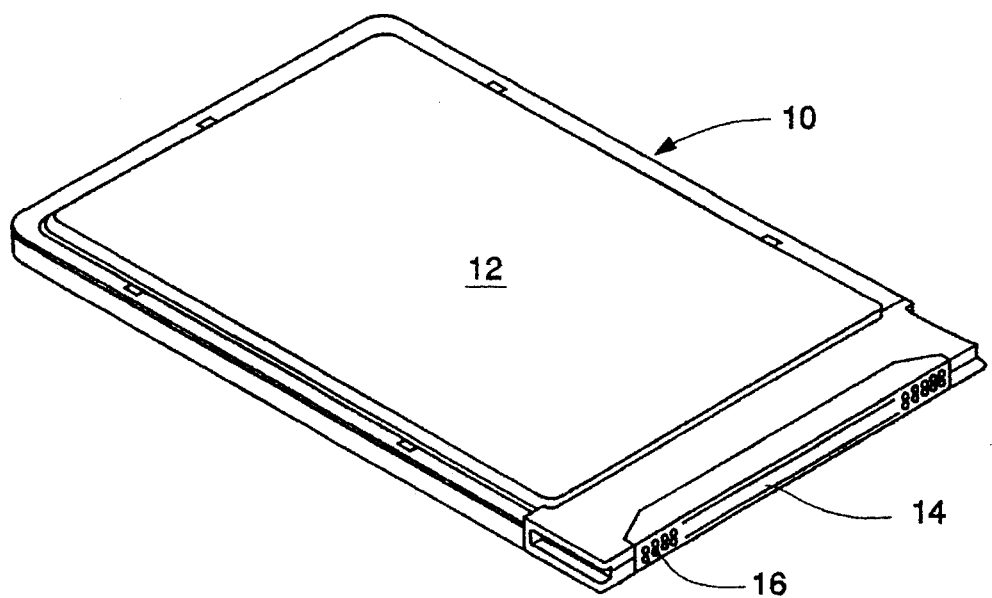
FIG. 1 is a perspective view of a hard disk drive of the present invention.

Referring to the drawings more particularly by reference numbers, FIGS. 1 shows a hard disk drive to of the present invention. The disk drive 10 is constructed as a card which can be plugged into a host computer (not shown). The unit 10 includes a housing 12 and a connector 14. In the preferred embodiment, the housing has a length and width of 85.6× 54.0 millimeters, and a thickness of either 5.0 or 10.5 millimeters. The dimensions conform with the specifications issued by the Personal Computer Memory Card International Association (PCMCIA) for a type II or a type III electronic card. The PCMCIA is an association that has promulgated a specification which list dimensions and other requirements for a standard electronic card. Each computer that conforms with the PCMCIA specification will contain slots that can receive a standardized card. With such a standard, electronic cards of one computer can be readily plugged into another computer, regardless of the model or make of the systems. A copy of the PCMCIA standard can be obtained by writing to the Personal Computer Memory Card International Association at 1030 G East Duane Avenue, Sunnyvale, Calif. 94086.

The PCMCIA standard includes three types of cards which each have varying thicknesses. A type I card is approximately 3.3 millimeters thick, a type II card is approximately 5.0 millimeters thick and a type III card is approximately 10.5 millimeters thick. The computer has a plurality of adjacent slots that are wide enough to receive a type II card. Both the type I and II cards occupy a single slot, while the type III card occupies two slots. Each computer slot contains a 68 pin connector that is typically mounted to a motherboard to provide an interconnect to the computer system. The PCMCIA standards were originally established for memory and/or logic cards including internal modem and facsimile boards.

In the preferred embodiment, the connector 14 of the card assembly 10 has 68 pins which can mate with the 68 pin connector located in the computer. The connector 14 is typically constructed from a dielectric material that has a plurality of sockets 16 which mate with pins (not shown) located in the computer connector. The connector has certain pins designated for power, ground and data. As required by the PCMCIA specification, the sockets dedicated to ground are longer than the sockets dedicated to power, and the sockets dedicated to power are longer than the sockets dedicated to data. Such an arrangement allows the card to be plugged into an operating "live" system, without creating voltage spikes or power surges within the card.

As shown in FIG. 2, the hard disk drive contains a disk 18 that is rotated by a spin motor 20. The disk 18 is typically constructed from a metal, glass, ceramic or composite substrate that is covered with a magnetic coating as is known in the art. The disk 18 rotates relative to an actuator arm assembly 22 which has a pair of transducers 24 commonly referred to as heads. The transducers 24 contain a coil (not shown) which can magnetize and sense the magnetic field of each corresponding adjacent surface of the disk 18. Each head 24 is supported by a flexbeam 26 that is attached to an actuator arm 28. The heads 24 each contain a slider (not shown) which cooperate with the air stream produced by the rotation of the disk 18 to create an air bearing between the surface of the disk and the transducer. The air bearing lifts the head 24 off of the surface of the disk 18. The flexbeams 26 are constructed to be flexible enough to allow the heads 24 to be separated from the disk surface by the air bearings and take up the disk 18 and motor 20 axial runout. The heads 24 can be constructed to provide either horizontal or vertical recording.

The actuator arm 28 pivot about a bearing assembly 30 which has a bearing block 32 that extends from the base plate 34 of the disk drive. The bearing assembly 30 includes a triangular shaped roller bearing 36 which extends into a V shaped slot 38 in the block 32. The roller bearing 36 is pressed into contact with the block 32 by a C shaped spring clip 40. The apex of the roller bearing 36 engages the apex of the slot 38 such that the bearing rolls relative to the block 32 when the actuator arms 28 are rotated about the bearing assembly 30.

At the end of the actuator arm 28 is a magnet 42 located between a pair of stationary coils 44. The magnet has north (N) and south (S) poles, so that when a current is sent through the coils in one direction the north pole experiences a force perpendicular to the coils, and when current is provided in an opposite direction the south pole experiences a force in the same direction. The magnet and coils, commonly referred to as a voice coil motor or VCM 46, rotate the actuator arm 28 and move the heads 24 relative to the disk 18.

The connector 14 is located at one end of the housing 12 and is captured by indent surfaces 48 in the base plate and the cover. The indent surfaces 48 prevent the connector 14 from moving in any direction relative to the housing 12. The connector sockets 16 each have tails 50 that are soldered to conductive surface pads 52 on a printed circuit board 54 (PCB). The printed circuit board 54 is supported by the housing 12 and contains all of the electrical components required to operate the disk drive assembly 10.

Figure 3:
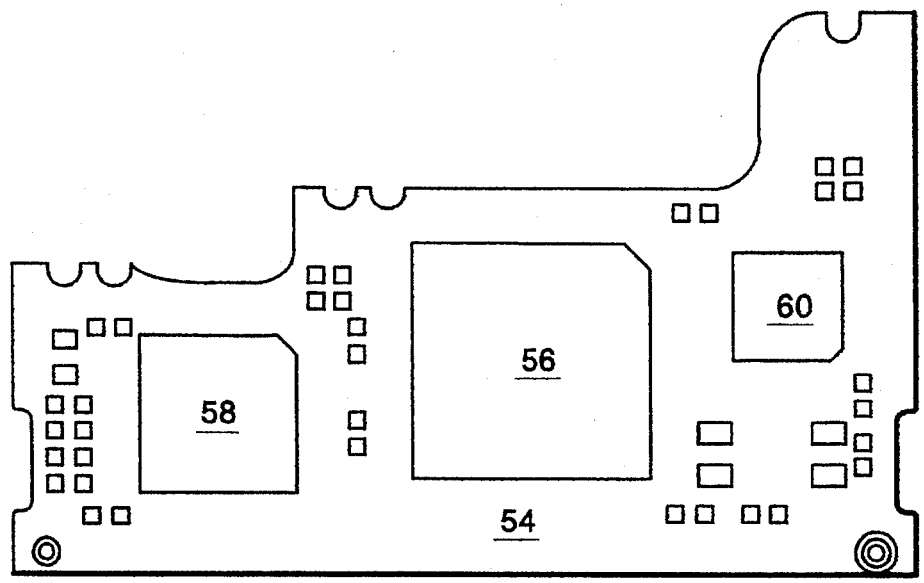
FIG. 3 is a bottom view of the printed circuit board.

As shown in FIG. 3, mounted to the printed circuit board 54 is a controller chip 56, a read/write channel chip 58 and a servo chip 60. Each chip is housed within an integrated circuit package that is soldered to the board 54 by conventional techniques well known in the art. As shown in FIG. 2, the opposite side of the circuit board 54 contains a data manager chip 62, a pre-amplifier chip 64 and a read only memory (ROM) chip 66. The board 54 also contains passive elements such as resistors 68 and capacitors 70 to complete the electrical system of the drive assembly. The entire board 54 is located between the disk 18 and the connector 14.

As shown in FIG. 2, the printed circuit board 54 is coupled to the actuator arm assembly by a flexible circuit board 72. The disk drive assembly also contains flexible circuits 74 and 76 that couple the printed circuit board 54 to the coils of the voice coil motor and the windings of the spin motor 20, respectively.

Figure 4:
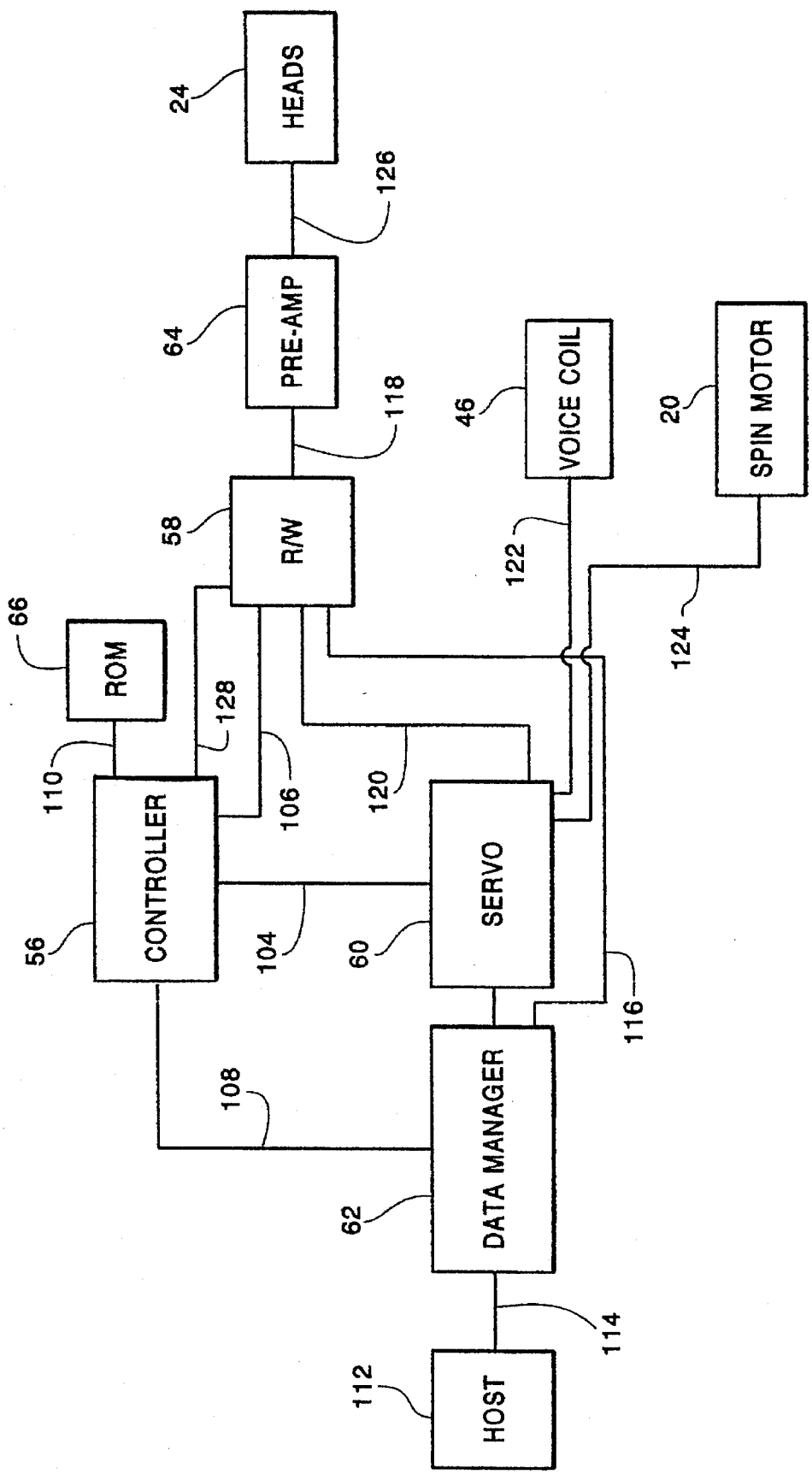
FIG. 4 is a schematic of the system architecture of the disk drive.

FIG. 4 shows a schematic of the system architecture of the hard disk drive assembly 10. The system controls the operation of the disk drive. Data is typically stored on a magnetic disk 12 along annular tracks concentric with the diameter of the disk. In the preferred embodiment, the disk is 1.8 inches in diameter. Although a 1.8 inch disk is described, it is to be understood that the present invention can be used with disks having other diameters such as 1.3", 2.5", 3.5", etc. For a 1.8" disk, the system will typically store data on 130 tracks per disk surface. Each track contains a plurality of servo sectors. Each sector is capable of storing up to 768 bytes of data. The total assembly is capable of storing up to 130 Mbytes of data.

As shown in FIG. 4, the system 10 includes the data manager chip 62, the controller chip 56, the servo chip 60 and the read/write ("R/W") chip 58. The system also has the read only memory ("ROM") device 66 coupled to the controller 56, and the pre-amplifier circuit ("pre-amp") 64 connected to the heads 24 and the R/W chip 58. The controller 56 is coupled to the servo 60 and R/W 58 chips through serial lines 104 and 106, respectively. The controller 56 is coupled to the data manager 62 by address/data bus 108 and to the ROM 102 by instruction bus 110. The data manager 62 is coupled to a host 112 by address/data bus 114 and to the R/W chip 58 by data bus 116. The R/W chip 58 is connected to the pre-amplifier chip 64 by lines 118. The servo chip 60 is coupled to the R/W chip 58 through servo lines 120. The servo chip 60 is also connected to the voice coil 46 and spin motor 20 through lines 122 and 124, respectively. The pre-amp chip 64 is connected to the heads 24 through lines 126. The controller 56 is also coupled to the R/W chip 58 by raw data line 128. The serial lines and address/data busses contain control signal lines which are needed to transfer information between the respective chips. Although the term line is used throughout this specification, it is to be understood that the term line may include multiple lines.

Figure 5:
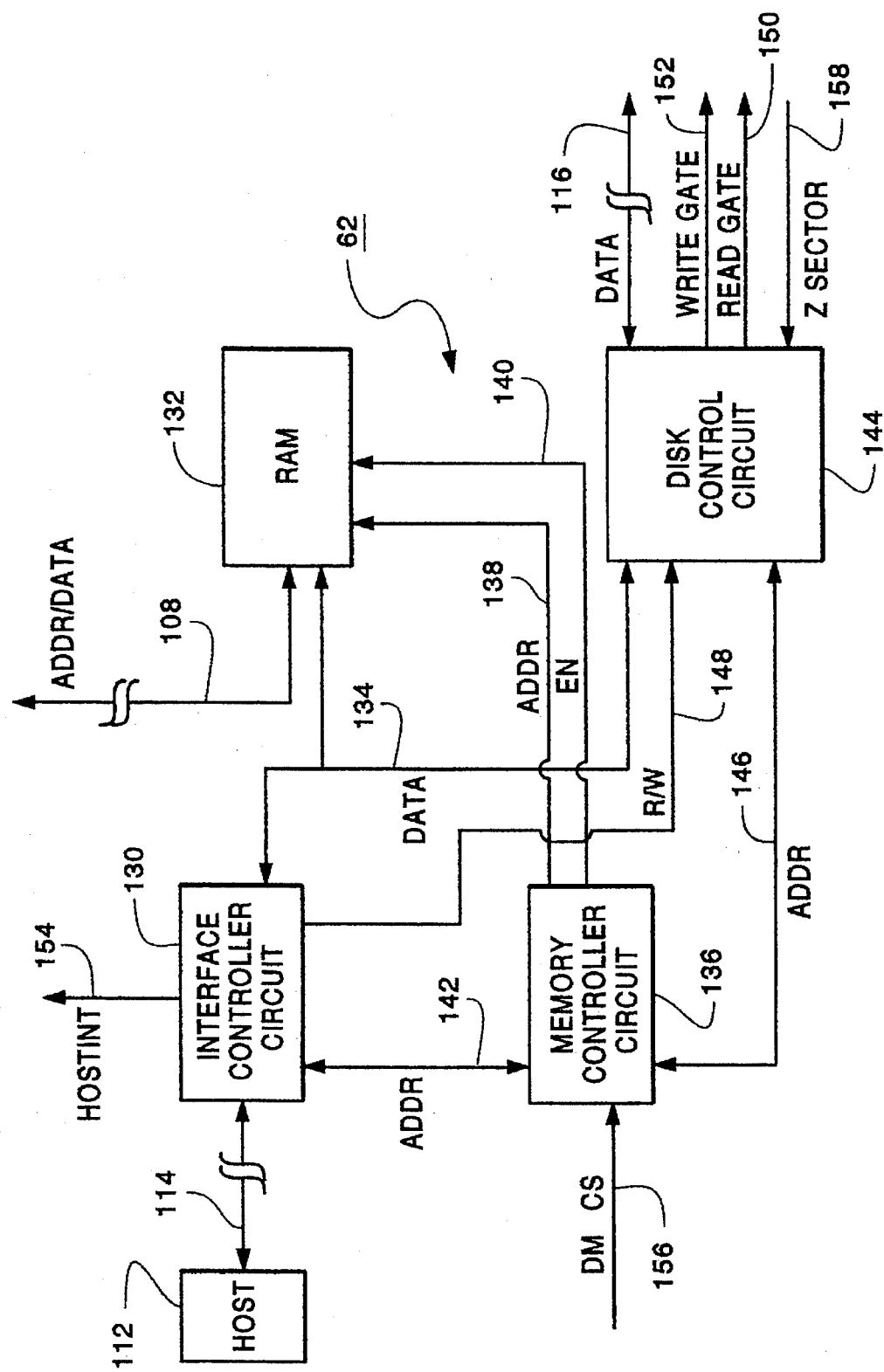
FIG. 5 is a schematic of the data manager chip of the system.

As shown in FIG. 5, the data manager 62 is coupled to the host 112 by a host interface controller circuit 130. The interface controller 130 contains hardware to interface with the host 112 by providing return handshakes, etc. in accordance with the host protocol. In the preferred embodiment, the interface controller 130 complies with the PCMCIA protocol. The interface controller 130 is coupled to a random access memory (RAM) device 132 through data bus 134. The RAM 132 provides a data buffer to store the data transferred between the host 112 and the disk 18. In the preferred embodiment, the RAM can store up to 4.0 Kbytes of data. 3.5 Kbytes of memory is typically dedicated to storing data transferred between the host and the disk. The remaining 0.5 Kbytes of memory provide a scratch pad which is typically dedicated to storing certain predetermined disk drive characteristics. When each disk drive is assembled, various characteristics of the drive unit are determined and stored on the disk. When the disk drive is powered up, the controller performs an initialization routine. Part of the routine retrieves the drive characteristics from the disk and stores the same in the scratch pad portion of the RAM.

The management of the RAM 132 is controlled by a memory controller circuit 136 which provides addresses to the memory device 132 on address bus 138 and an enable control signal on line 140. The memory controller circuit 136 receives access request from the interface controller circuit 130 through lines 142. The controller circuit 136 also receives access request from a disk controller circuit 144 through lines 146. The disk controller circuit 144 provides an interface between the disk manager chip 62 and the R/W chip 58. The disk controller circuit 144 receives read/write control signals on lines 148 from the interface circuit 136 which are relayed to the R/W chip 58 on read and write gate lines 150 and 152. The interface, memory and disk controller circuits are also connected to the controller chip 56 through lines 154, 156 and 158.

The memory controller 136 controls the storage and retrieval of data between the RAM 132 and interface controller circuit 130, between the RAM 132 and the disk controller circuit 144 and between the controller chip 56 and the data manager chip 62. The RAM 132 and controller chip 56 are coupled together by dedicated data bus 108. The controller chip 56 provides addresses and a data manager chip select (DM CS) control signal 156 when the controller chip 56 wants access to the RAM 132.

To write data onto the disk 18, the host 112 initially provides a write request that is received by the interface controller circuit 130, which executes the requisite handshaking sequence. The interface controller circuit 130 generates an access request to the memory controller circuit 136 to store the logical addresses and data from the host to the memory buffer 132. The memory controller circuit 136 then stores the data in the buffer 132 in accordance with a memory mapping scheme. The interface controller circuit 130 generates a HOSTINT interrupt signal that is sent to the controller chip 56.

After acknowledging the HOSTINT signal, the controller chip 56 will request access to the RAM 132 to read the logical addresses provided by the host 112. The controller chip 56 converts the logical addresses to physical disk addresses. The controller chip 56 may then initiate a seek routine to move the heads 24 to the proper location on the disk 18. When the voice coil 46 has moved the transducers 24 to the desired disk sector, the controller chip 56 provides a Z sector signal to the data manager 62. Upon receiving the Z sector signal, the disk controller circuit 144 provides a data access request to the memory controller circuit 136. The memory controller circuit 136 initiates a write sequence onto the disk 18 by placing the corresponding contents of the RAM 132 onto the bus 116.

To read data, the host 1212 provides a read request that is received by the interface controller circuit 130. The requested logical addresses are stored in the buffer 132. A HOSTINT signal is generated and the logical addresses are retrieved by the controller chip 56. The controller chip 56 converts the physical addresses to the actual sectors on the disk and then initiates a seek routine to move the actuator arm, accordingly. When the transducers are above the proper disk location, the controller chip 56 provides a Z sector signal to the data manager 62. The disk controller circuit 144 then generates a memory access request to the memory controller circuit 136 which enables the RAM 132. Data is then transferred from the R/W chip 58 to the buffer 132 through the disk controller circuit 144. The memory controller circuit 136 then transfers the data from the RAM 132 to the host 112 through the interface controller circuit 130.

Figure 6:
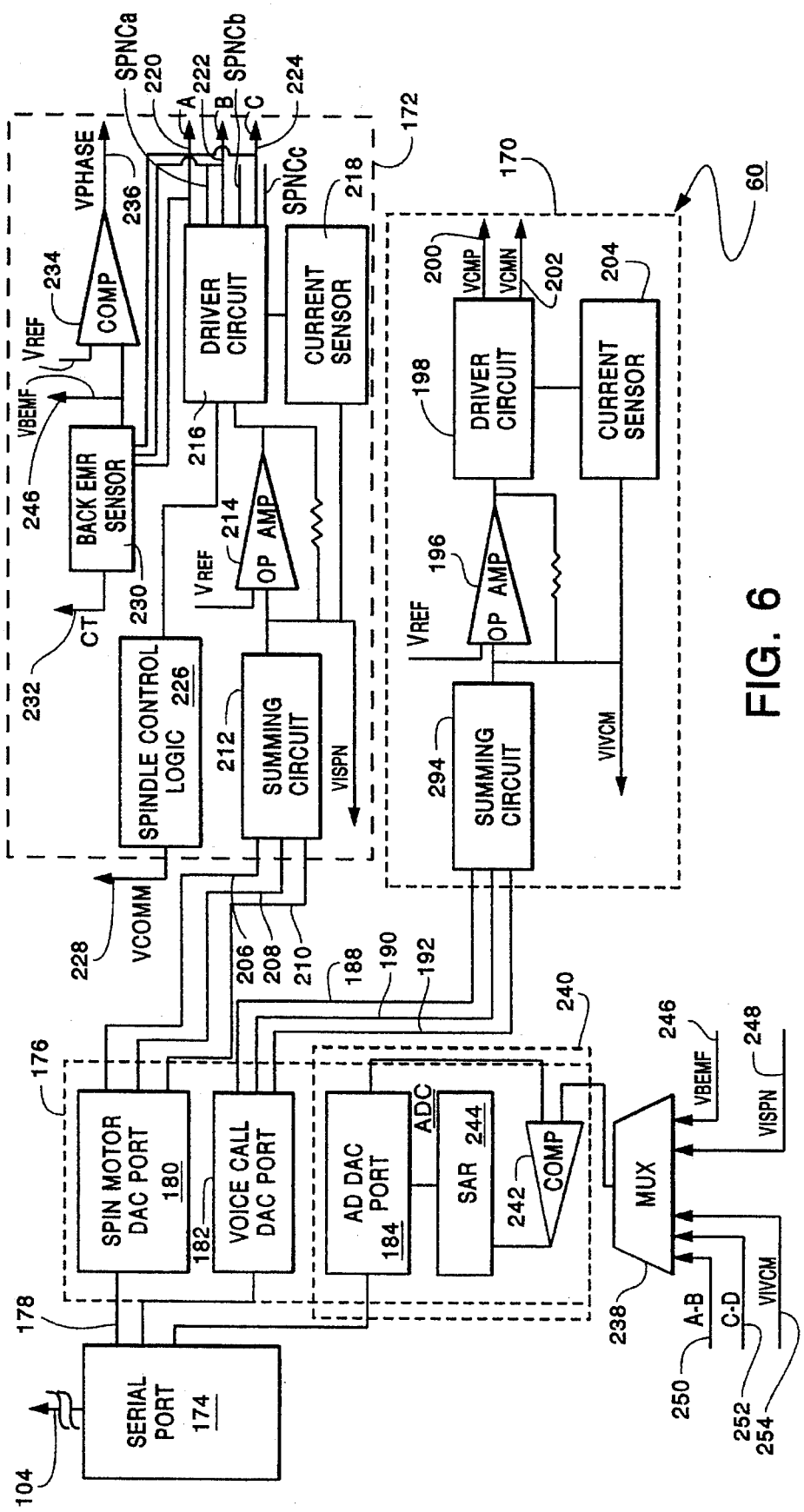
FIG. 6 is a schematic of the servo chip of the system.

As shown in FIG. 6, the servo chip 60 contains a voice coil control circuit 170 and a spin motor control circuit 172 to drive the voice coil 46 and spin motor 20, respectively. The servo chip 60 is coupled to the controller chip 56 by a bi-directional 16 bit synchronous serial port 174. The serial port 174 is coupled to a digital to analog (Dac) converter 176 by lines 178. The Dac 178 contains a spin motor Dac port 180, a voice coil Dac port 182 and an analog to digital (Ad) Dac port 184.

The voice coil port 182 provides three analog signals, Vvcmoffset, Vvcmtrack and Vcm gain range to the voice control circuit 170 on lines 188–192. The three signals are summed within a summing circuit 194. The Vvcmoffset signal provides the bias voltage for the voice coil 46. The Vvcmtrack signal provides a secondary voltage signal, that will vary the bias signal to more accurately control the driving signal of the voice coil 46. The Vcm gain range signal is another secondary signal that provides a higher resolution of the bias signal and is typically employed during a servo routine of the drive. The amplitudes of the Vcm signals are determined by a 8 bit data stream which is provided by the controller chip 56 to the voice coil port 180 through the bi-directional serial port 174. The data command is accompanied by a 7 bit address and a read/write bit which are decoded by the serial port. The data is directed to the appropriate Dac port in accordance with the contents of the 7 bit address.

The summation circuit 194 provides a signal to an operational amplifier 196 which biases a driver circuit 198. The driver circuit 198 is connected to the coils 44 of the voice coil through pins VcmP 200 and VcmN 202. The voice coil control circuit 170 also contains a current sensor 204 which is fed back to the operational amplifier 196 to provide a direct current control of the current supplied to the voice coil 46.

The spin motor port 180 provides analog signals Vspnoffset, Vspntrack and Vspn gain range to the spin motor control circuit 172 through lines 206–210. The signals are received by the spin motor circuit which contains essentially the same components, summation circuit 212, op-amp 214, driver circuit 216 and current sensor 218, as the voice coil circuit 170. The summing circuit sums the Vspn( ) signals as described above. Like the voice coil signals, the offset signal provides a bias voltage and the other signals provide an adjustment of the bias voltage. The driver circuit 216 is connected to the windings of the spin motor through pins A, B and C on lines 220–224, respectively. The driver circuit 216 is controlled by spindle control logic 226 which sequentially enables the proper combination of drivers of the output lines A, B and C after receiving a commutation advance signal provided by the controller chip 56 on the Vcomm line 228. Each time a commutation advance signal Vcomm is provided, the control logic 226 sequentially enables the correct drivers, so that a current is provided to the spin motor in the proper combination of lines A, B or C.

The spin motor control circuit 172 has a back emf sensor 230 connected to the lines A, B and C and the center tap (CT) of the motor on line 232. The sensor 230 provides a back emf signal to a comparator 234 which compares the signal to a reference voltage. The comparator 234 provides a Vphase signal to the controller chip 56 on line 236. The controller chip 56 utilizes the Vphase signal to commutate the spin motor 20 through the Vcomm line 228. In the preferred embodiment, the driver circuit 216 has additional lines SpnGa, SpnGb and SpnGc which can be connected to additional drivers to increase the current level provided to the motor. This feature allows the servo chip 60 to be used in disk drives which contain additional disk that require higher rotating torque.

The servo chip 60 has an analog multiplexer 238 which receives various input signals. The signals are multiplexed to an analog to digital (Adc) converter 240 which utilizes the digital to analog circuits of the Dac converter 176. The Adc includes a comparator 242, and a serial approximation register (SAR) 244 which generates a series of 8-bit data strings.

In operation, the multiplexer 238 provides an analog signal to the comparator 242. The SAR 244 generates successive 8 bit words that are sent to the Ad DAC port 184 which converts the word to an analog comparator signal. The analog comparator signal is compared with the analog signal from the multiplexer 238. The first word has the most significant bit set to 1 and all other bits set to 0. If the most significant bit is greater than the analog signal, then a bit 1 is provided to the serial port 174. The SAR 244 generates the next 8 bit word which is again converted to an analog signal and compared by the comparator 242. The new word has the next least significant bit set to 1. This routine is continued until 8 bits are provide to the serial port 174 to define the amplitude of the analog signal. The serial port 174 then sends the bits to the controller chip 56 through the serial line 104.

The multiplexer 238 receives input signals Vbemf and Vispn from the back emf sensor 230 and current sensor 218 on lines 246 and 248, respectively. A-B and C-D servo signals from the R/W chip 58 are provided to the multiplexer 238 through lines 250 and 252. The output signal Vivcm of the voice coil current sensor 204 is provided to the multiplexer 238 on line 254. These feedback signals are transmitted to the controller chip 56 through the Adc 240 and the serial port 174.

The voice coil control circuit 170 positions the heads 24 relative to the disk in response to commands from the controller chip 56. The controller chip 56 and control circuit 170 move the actuator pursuant to either a seek routine or a servo routine. In a seek routine the heads 24 are moved from a first track location on the disk to a second track location on the disk. The servo routine is used to maintain the transducers 24 on the centerlines of the tracks.

Figure 7:
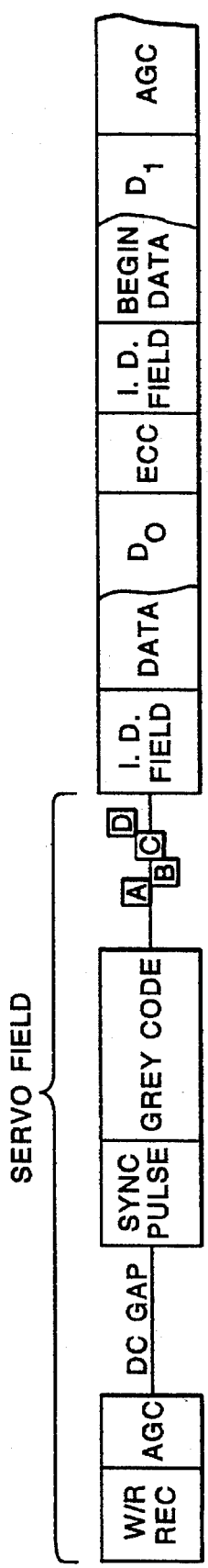
FIG. 7 is a representation of a sector of the disk.

In the preferred embodiment, the disk 18 contains embedded servo information. FIG. 7 shows a typical sector on a track of a disk. Each sector initially contains a servo field followed by an ID field. The ID field includes a header address that identifies the sector. The ID field is followed by a data field and error correction code information. The ECC field is followed by another ID field which identifies a subsequent data field D1 that contains a fraction of the data of data field D0.

The servo field initially contains a write to read field and than an automatic gain control (AGC) field that is followed by a period of no data (DC gap). At the end of the DC gap is a sync pulse. The servo field also includes a gray code to identify the particular cylinder (tracks) of the sector and a number of servo bursts A, B, C and D. Servo bursts A and B have an outer edge at the centerline of the track. Servo burst C is centrally located on the centerline of the track for even numbered tracks. Servo burst D has a bottom edge located at the top edge of servo burst C. The position of the transducer relative to the centerline of the track can be determined by reading the amplitudes of servo bursts A–D. The AGC field is used to set the reference voltage value of the servo bursts.

The sync pulse is identified as the first voltage transition that is sensed after a predetermined number of clock cycles having no transitions after the AGC field. For example, after the transducer senses the AGC field, three clock cycles may occur without any voltage transitions, before detection of the sync pulse. As an alternate scheme, the beginning of the gray code may provide a voltage transition which signifies the sync pulse.

Figure 8:
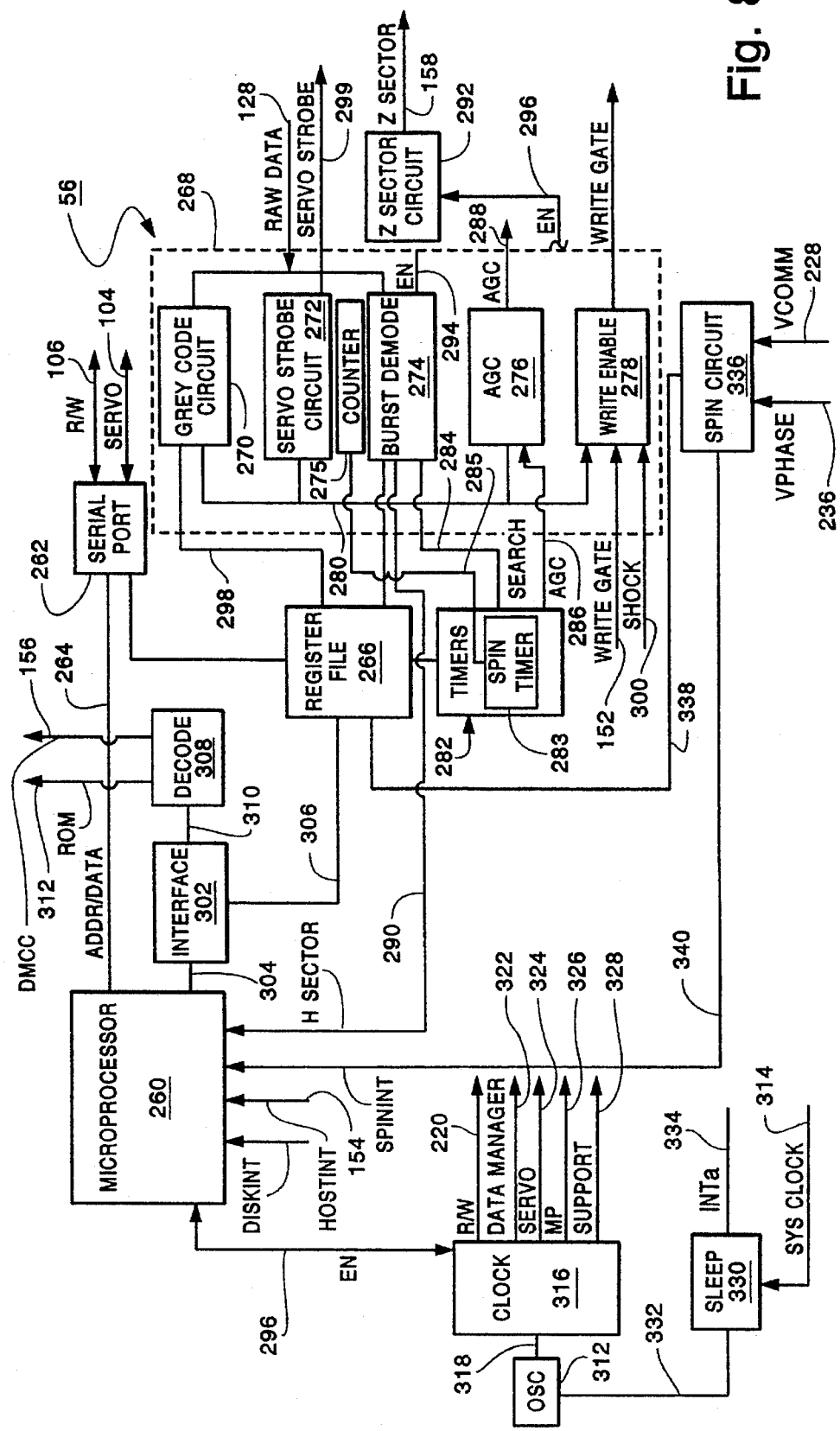
FIG. 8 is a schematic of the controller chip of the system.
Figure 10A:
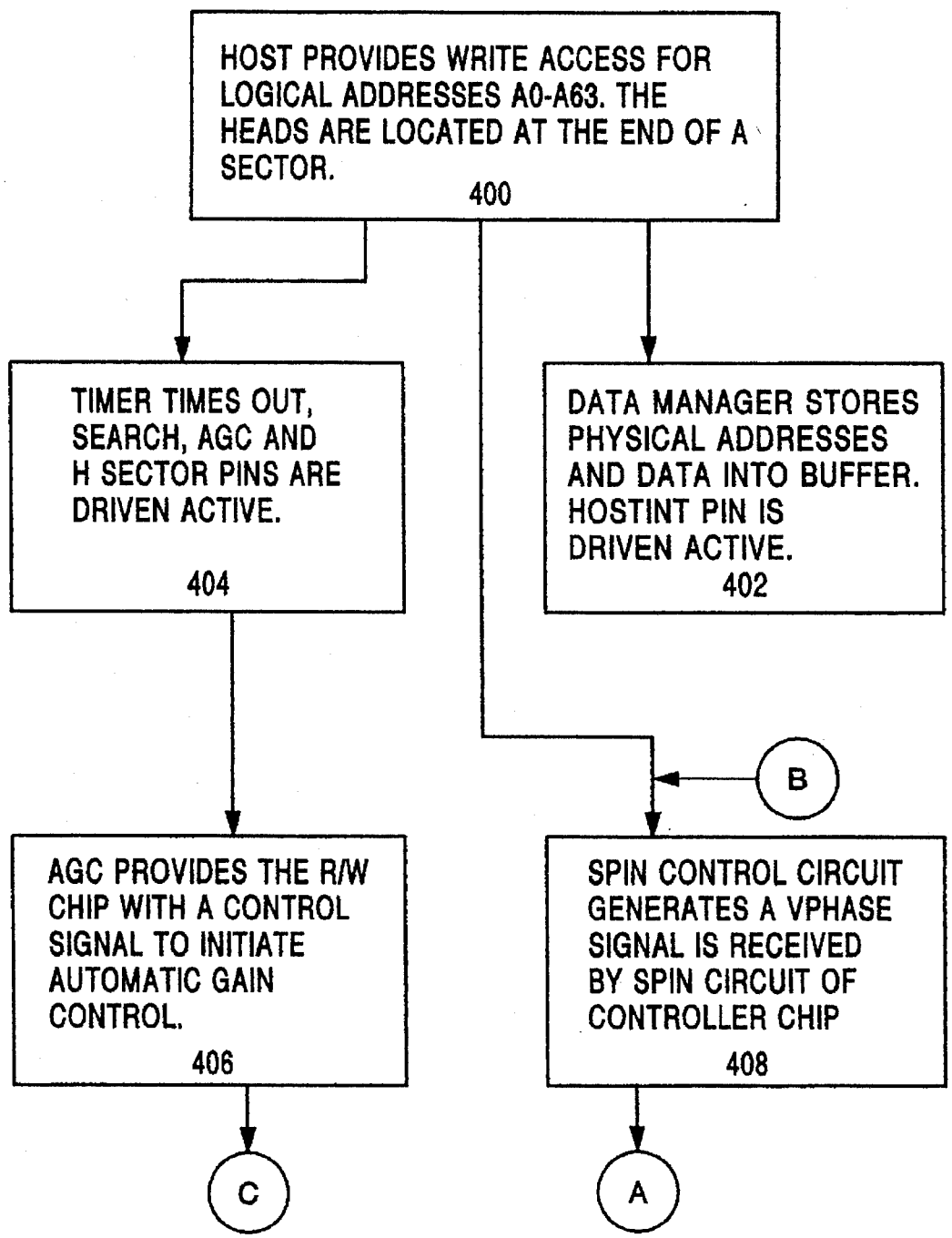
FIGS. 10a–g are flowcharts of the operation of the disk drive.
Figure 10B:
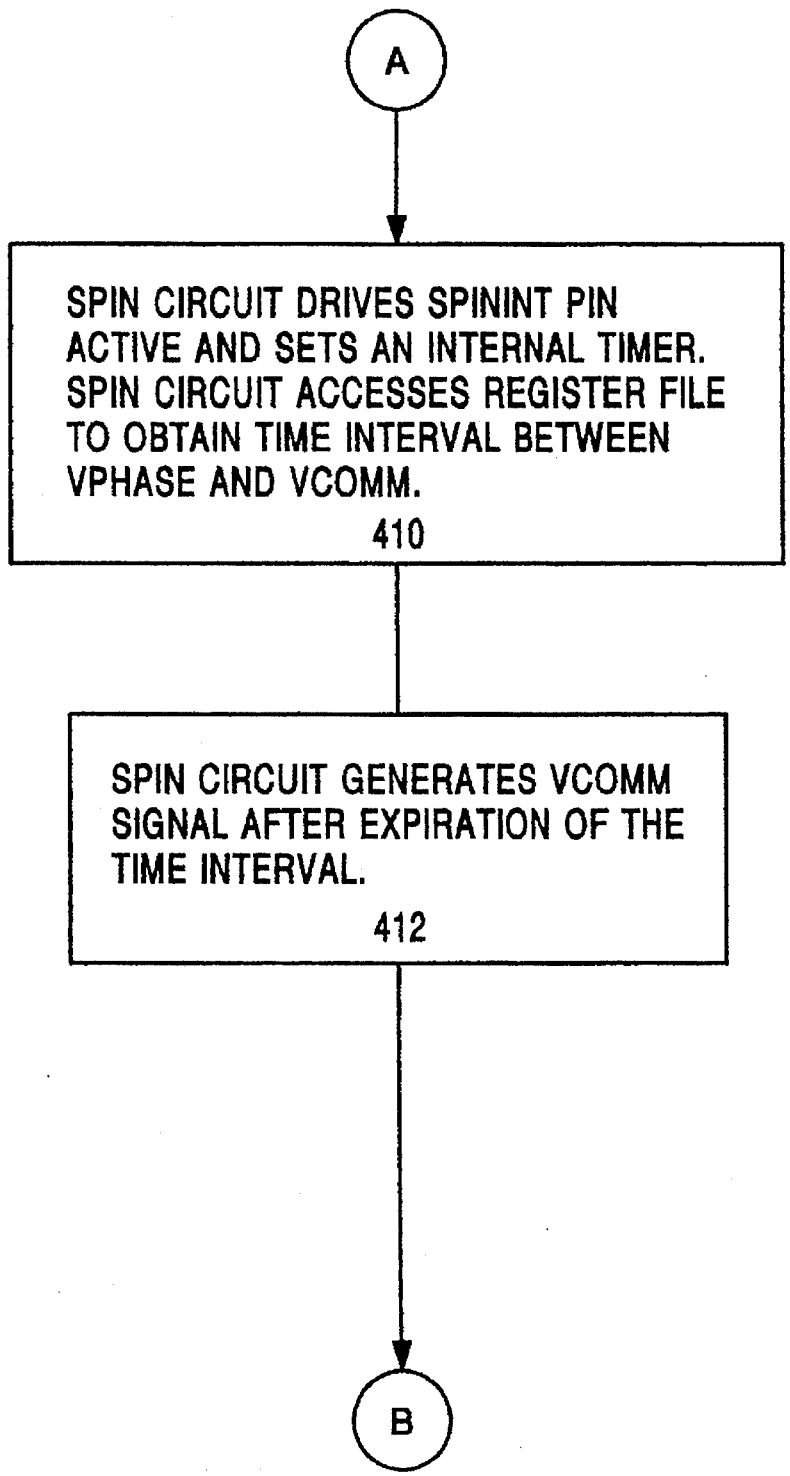
Figure 10C:
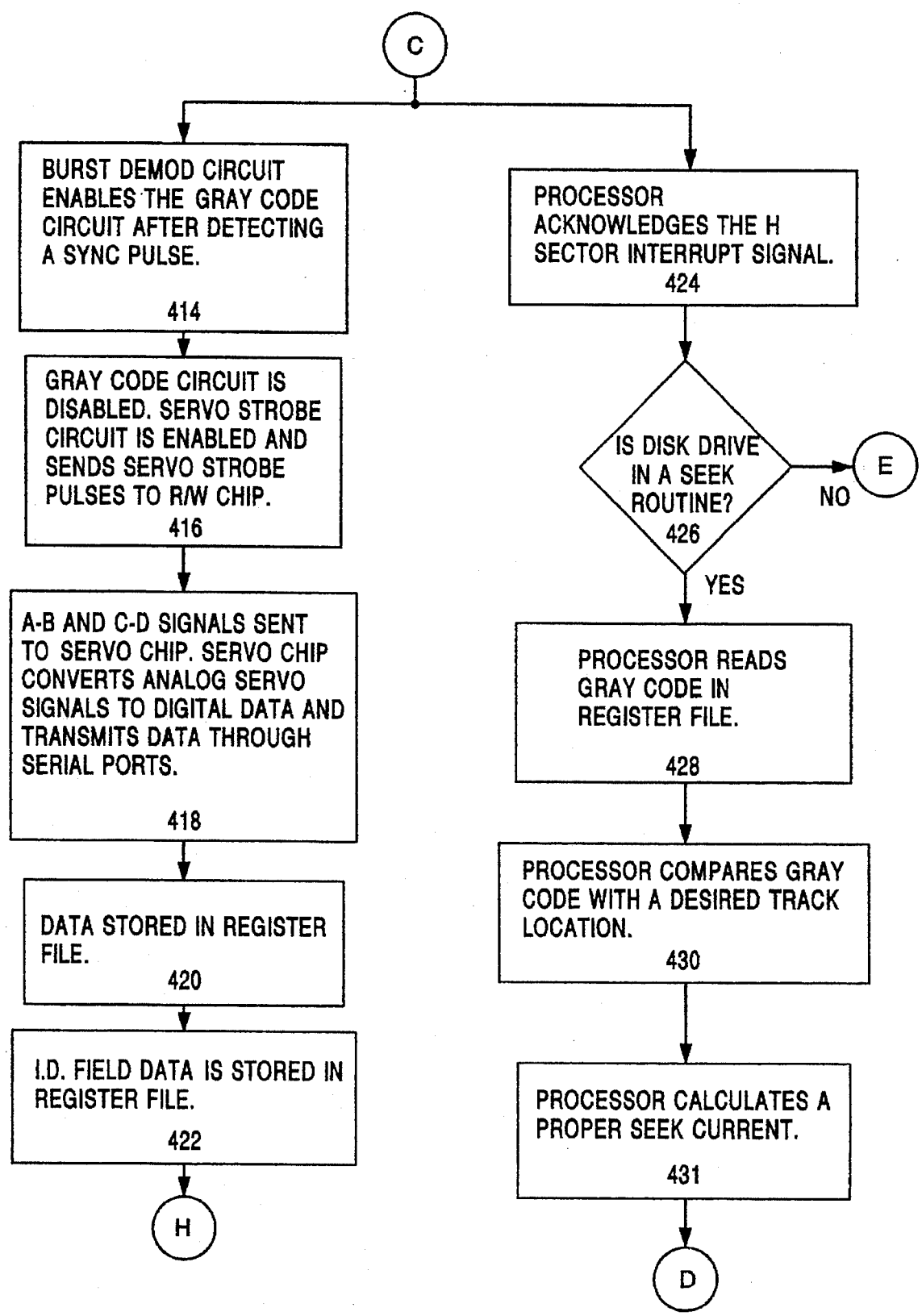
Figure 10D:
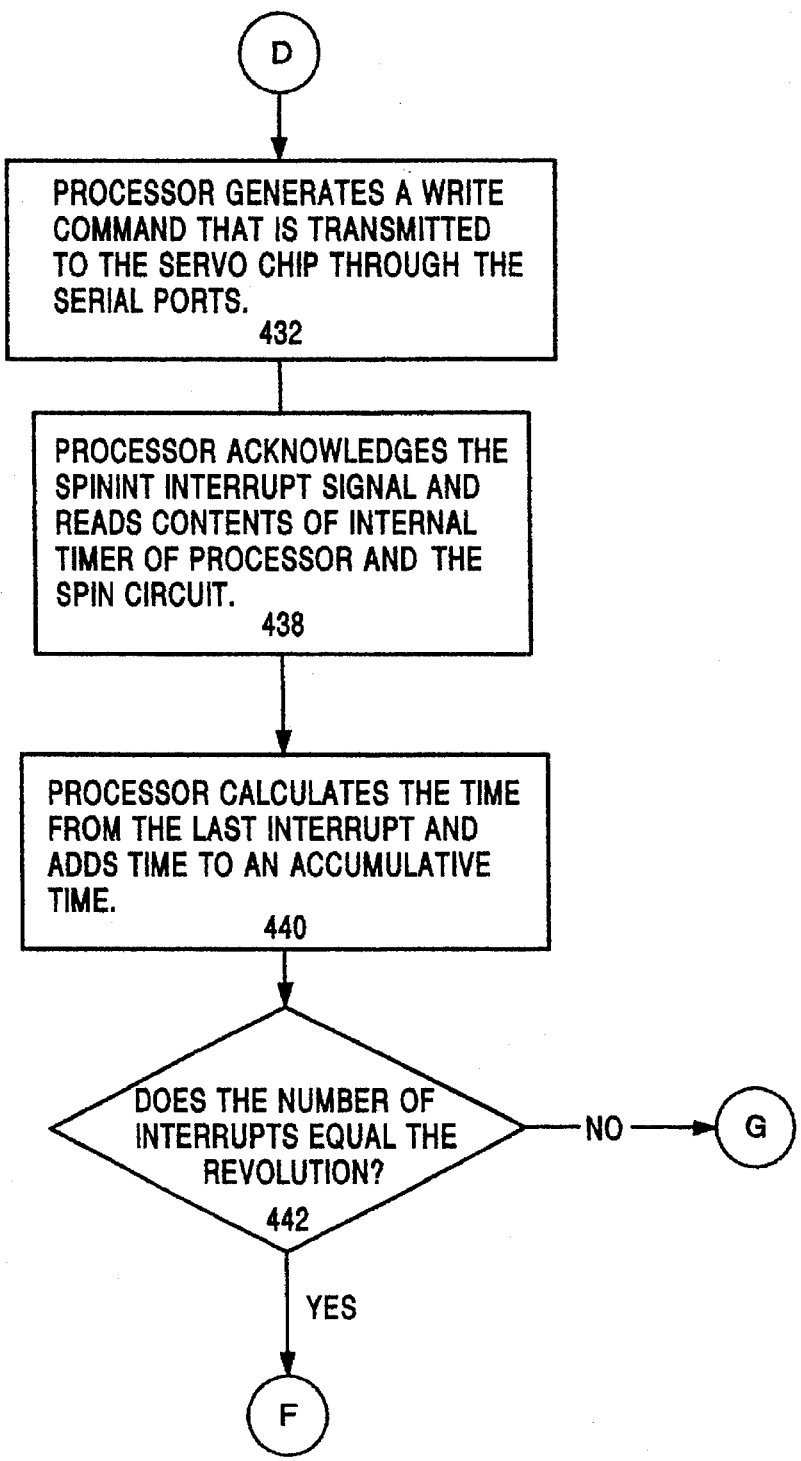
Figure 10E:
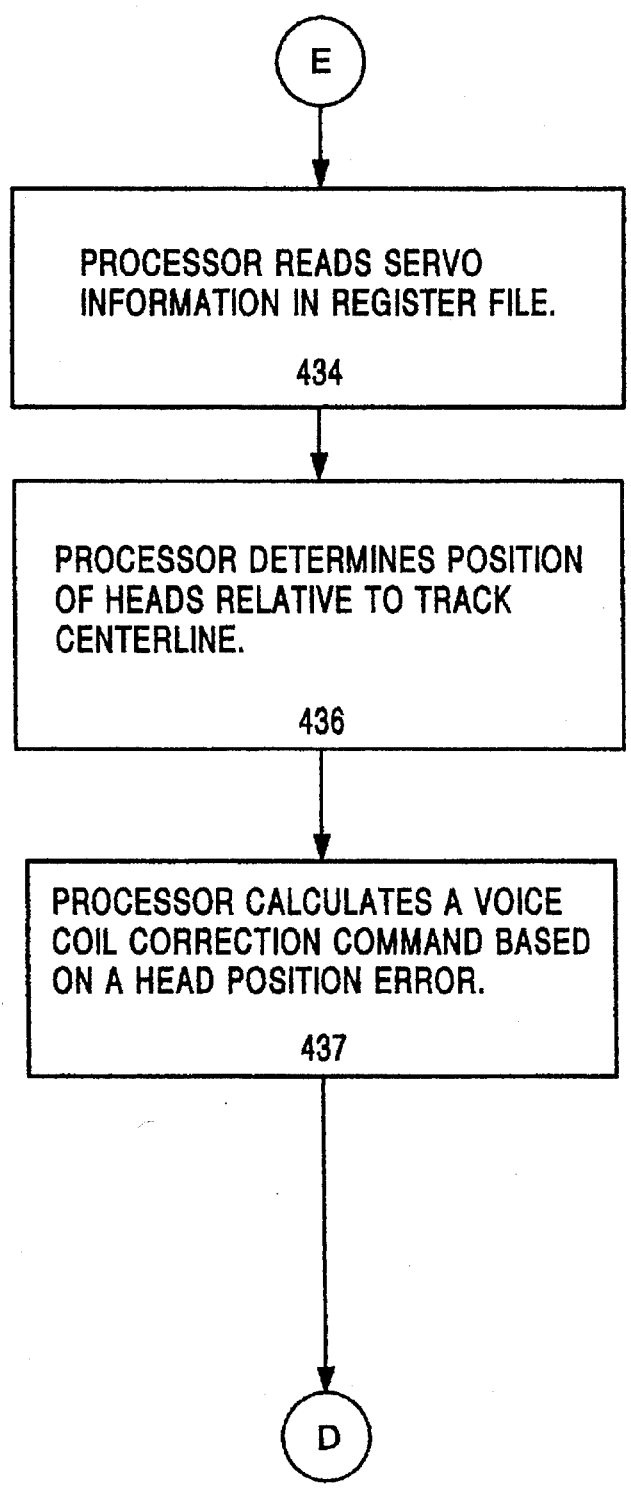
Figure 10F:
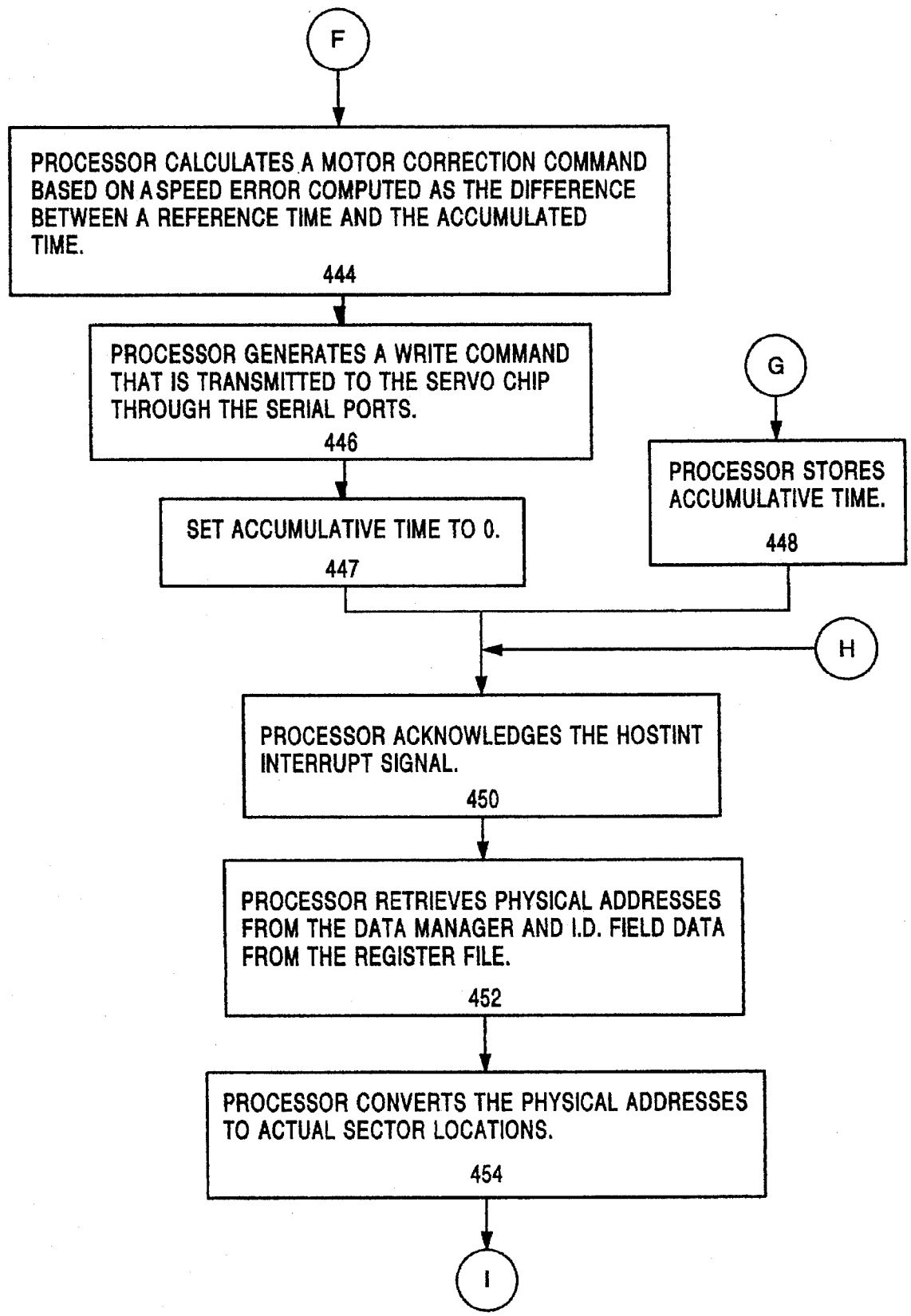
Figure 10G:
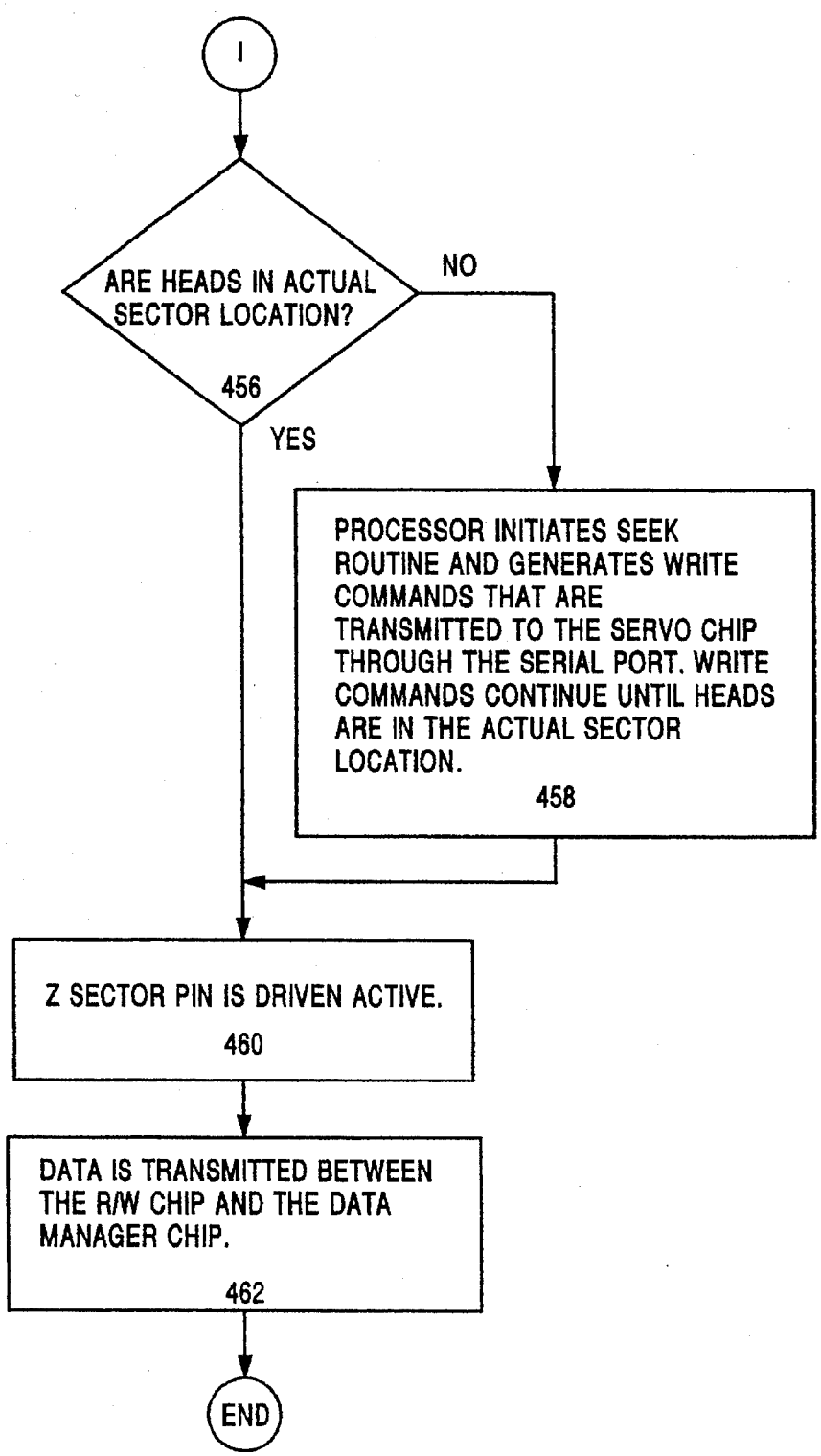

FIG. 8 shows a schematic of the controller chip 56 which contains a core microprocessor 260. In the preferred embodiment, the core is a modified version of a processor sold by Texas Instruments Inc. ("TI") under the part designation DSP TMS320C25. The processor 260 operates with less instruction sets than a conventional hard disk drive controller such as the controller chip sold by Intel Corp. under the family designation 80C196. The decrease in instruction sets results in less memory access request. The processor block 360 includes RAM memory (not shown). Conventional RAM devices operate with a 5.0 V nominal power supply. It is desirable to provide a hard disk drive that will run on 3.3 V nominal, a voltage level that is commonly used in portable laptop computers. Conventional RAM devices respond to processor memory access request at a slower speed when operating at 3.3 V, than when the RAM device is operating at 5.0 V. The slower RAM speed degrades the performance of the processor. Utilizing a processor which requires fewer memory access request for a given function provides a system that can operate on 3.3 V without appreciably affecting the performance of the processor.

The DSP microprocessor has two separate internal busses (not shown) for transferring instructions and data. The dual bus architecture allows the processor to execute fetching, decoding, reading and executing routines in parallel. The pipeline feature of the DSP significantly increases the performance of the processor. The DSP processor has on board memory that functions as both registers and a RAM device.

The controller chip 56 also has supporting "on-chip" hardware coupled to the processor 260. The supporting hardware includes a bi-directional 16 bit synchronous serial port 262 that is coupled to the servo 60 and R/W chips 58 through the serial lines 104 and 106, respectively. The serial port 262 is also connected to the processor 260 through bus 264. The serial port 262 contains registers that provide a buffer between the processor 260 and the chips 58 and 60. The port 262 also generates chip select signals for the R/W chip 58 and the servo chip 60 in response to addresses provided by the processor 260. The serial port 262 is connected to a register file 266.

The controller chip 56 has a state machine 268 which contains a gray code circuit 270, servo strobe circuit 272, burst demod circuit 274, automatic gain control (AGC) circuit 276 and a write disable circuit 278. The burst demod 274 controls the operation of the other circuits through lines 280. The demod circuit 274 is connected to a timer circuit 282 through line 284. Both the gray code circuit 270 and the burst demod circuit 276 are connected to a raw data line 128 to receive raw data from the R/W chip 58.

The timer circuit 282 has a number of timers, one of which "times out" prior to the servo burst of a sector. When the pre-servo timer times out, the timer circuit 282 provides an AGC signal to the AGC circuit 276 on line 286. The AGC signal activates the AGC circuit 276, which enables the automatic gain control circuitry of the R/W chip 58 through line 288. The timer circuit 282 also provides a search signal to the burst demod 274 on line 284. The search signal enables the burst demod 274 to begin searching for the sync pulse within the servo burst of the sector. Upon receipt of the search signal, the burst demod 274 enables an internal sync mark field when no signal transitions (from the raw data line 128).occur within a predetermined number of clock cycles. If a transition occurs within a predetermined time after the field is enabled, the burst demod 274 generates a H sector signal which signifies the detection of a sync pulse.

The H sector signal is provided to a Z sector circuit 292 on line 294 and to the processor 260 on line 290. The H sector signal from the demod circuit 274 sets a pair of timers within the Z sector circuit 292. The Z sector circuit 292 provides a Z sector signal to the data manager 62 and R/W 58 chips on line 158 when a timer "times out" There is preferably a timer for each data field Do and D1. The Z sector circuit 292 only generates a Z sector signal if the circuit 292 has been enabled by the processor 260 through enable line 296.

The burst demod 274 circuit enables the gray code circuit 272 after detection of the sync pulse. The gray code circuit 272 contains shift registers which store the gray code provided on the raw data line 128. The gray code is then stored in a dedicated address in the register file 266 through bus 298, for subsequent retrieval by the processor 260. The detection of the sync pulse also sets an internal timer in the burst demod 274. When the timer times out the burst demod 274 disables the gray code circuit 270 and enables the servo strobe circuit 272. The servo strobe circuit 272 sends out a series of two bit signals on line 299, to enable internal circuits within the R/W chip 58 to provide the A-B and C-D signals to the servo chip 60. The A-B and C-D signals are then sent to the register file 266 through the Adc converter 240 and the serial ports 174 and 262.

When the timer 282 generates the search signal, the burst demod 274 also enables the write disable circuit 278. The write enable line 152 from the data manager chip 62 is routed to the preamp 64 through the write disable circuit 278, so that the write disable circuit 278 can disable the write signal and prevent writing of data onto the disk. The write disable circuit 278 disables the write signal during the servo burst to prevent any writing of data onto the servo field. The write disable circuit 278 is also enabled by a shock sensor (not shown) through line 300. The shock sensor provides an enabling signal when the disk drive is accelerated beyond a predetermined value. The shock sensor and write disable circuit 278 prevent writing of data when the drive is subjected to an excessive shock.

The controller chip 56 contains a interface module 302 that is coupled to the processor 260 and register file 266 through busses 304 and 306. The interface module 302 provides a memory map between the processor 260 and the register file 266. The modular interface 302 allows the supporting on-chip hardware to be coupled to different types of processors. The module 302 is coupled to a decoder 308 through line 310. The decoder 308 decodes addresses provided by the processor 260 to enable chip select control signals ROM and DM that select either the ROM 66 or data manager chip 62 through lines 312 and 156.

The controller chip 56 contains an oscillator 312 which receives a clock signal from a system clock on line 314. The oscillator 312 provides a clocking signal to clock circuit 316 on line 318. The clock circuit 316 provides clocking signals for the R/W chip 58, data manager chip 62, servo chip 60, microprocessor 260 and the support hardware of the controller 56 on lines 320-328. In the preferred embodiment, the oscillator 312 generates a 30 MHz clock signal. The oscillator 312 is connected to a sleep circuit 330 through line 332. The sleep circuit 330 disables the oscillator 312 when an INTb signal is provided to the circuit 330 on line 334. The INTb signal is typically provided by the host processor (not shown). The host processor typically provides the sleep signal when a disk access request has not been generated for a predetermined time interval, by setting a bit within a register of the register file 266.

The support hardware also contains a spin circuit 336 which is connected to the servo chip 60 through the Vphase and Vcomm lines 236 and 228. The spin circuit 336 is connected to both the register file 266 and the processor 260 by lines 338 and 340. When the spin circuit 236 receives a Vphase signal, the circuit 336 provides an interrupt signal to the processor 260 on the SPININT line 340. The Vphase signal also sets an internal Vcomm timer within the spin circuit 336. Additionally, the spin block circuit 336 also reads a dedicated register(s) in the register file 266. The contents of the register file 266 provide a time interval between when the spin circuit 336 receives the Vphase signal and when the circuit 336 generates the Vcomm signal for the spin control circuit 172 of the servo module 60.

The processor 260 has a continuously running internal timer (not shown). When the processor 260 acknowledges the SPININT pin 340 and the line is activated by the spin circuit 36, the processor 260 reads the time of the internal timer and the value of the Vcomm timer in the spin circuit 336. The Vcomm timer value signifies the amount of time elapsed between the reception of the Vphase signal and the acknowledgment by the processor 260 of the SPININT interrupt signal. The Vcomm time is subtracted from the time value of the internal processor timer. The resulting time is compared to a theoretical time to determine if there is an error in the speed of the spin motor 20. The spin motor 20 typically has 12 poles wherein there are created 36 Vphase signals per revolution.

In the alternative, the speed of the spin motor 20 can be measured by counting a number of pulses between the end of the AGC field and the beginning of the DC gap. In this embodiment, a time field of microseconds is created between the end of the AGC field and the beginning of the DC gap of each disk sector. This time field contains a predetermined number of pulses. After a sync pulse is detected, a spin timer 283 is set. The spin timer 283 times out at the end of the AGC field of the next sector. The timer 283 enables a counter 275 in the burst demod 274 by activating pin 285. The counter 275 counts the number of pulse detected by the transducer. The number of pulses is then stored in the register file 266. After the processor 260 completes the voice coil 46 routine, the processor 260 retrieves the number of pulses counted by the counter 275 and compares the count to a nominal value. If the count is different than the nominal value, the processor 260 generates a digital command that is sent to the servo module 60 to either speed up or slow down the spin motor 20. The processor 260 also changes the timer 283 so that the timer 283 will time out at exactly the end of the AGC field of the next sector. In this manner the processor insures that the counter 275 always begins counting at the end of the AGC field, thereby insuring an accurate spin motor control error value.

The processor acknowledges the interrupt signals H sector, SPININT, HOSTINT and DISKINT in accordance with a hierarchy that responds to the H sector interrupt first (voice coil subtask), SPININT interrupt signal second (spin motor subtask) and then either the HOSTINT or DISKINT interrupt signals (data subtask). Accordingly, when the burst demod 274 detects a sync pulse signal, a pulse is sent to the processor 260 on the H sector line 290. Upon receiving the H sector signal the processor 260 may initiate a servo routine. The processor 260 initially reads the registers within the register file 266 that contain the gray code information. The processor 260 determines the cylinder location of the head 24 and then writes data containing voice coil control information to the serial port 262. The serial port 262 then sends the data to the servo chip 60. If the gray code corresponds to a desired track location (eg. for a read or write of data from the disk) the processor enables the Z sector circuit 292 through the enable line 296.

After the gray code is read, the processor 260 retrieves the A-B and C-D servo information. The servo burst information is processed by the processor 260 to determine the location of the head 24 relative to the centerline of the track. The processor 260 then writes data to the serial port 262 for subsequent transmittal to the servo chip 60. If the processor 260 is in a seek routine the servo information is not fetched from the register file 236.

After the servo routine, the processor acknowledges any SPININT signal from the spin circuit 336 and computes the difference between the actual motor speed and the theoretical motor speed. In the preferred embodiment, the processor stores the error values of each sector and computes a mean spin motor error each revolution of the disk. The processor 260 then writes control data to the servo chip 60 through the serial port 262 to control the speed of the spin motor 20, typically during an index sector that occurs once per revolution of the disk 18.

After the spin routine the processor 260 acknowledges any HOSTINT or DISKINT interrupt signals. If the HOSTINT pin is active, the processor 260 retrieves the logical addresses stored in the buffer 132 of the data manager 62. The processor 260 converts the logical addresses to actual sector locations on the disk. The processor 260 initiates a seek routine if the heads 24 are not above the desired track. Once the head reaches a desired sector of the head, the controller chip 56 provides the Z sector signal to the data manager 62 which then transfers, data with the R/W chip 58. An active DISKINT signal indicates the end of a data transfer or an error in the process of transferring data. The register file 266 typically has an error bit that is set when an error has occurred. The processor 260 reads the error bit and performs an error correction routine if there is an error.

Figure 9:
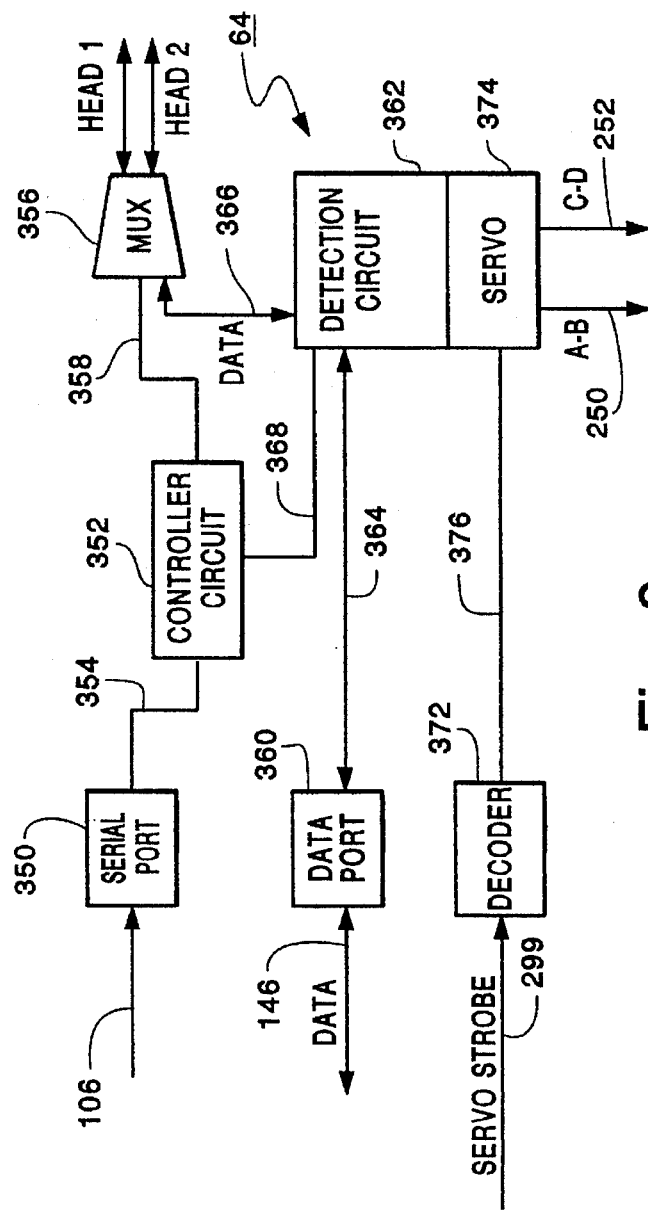
FIG. 9 is a schematic of the R/W chip of the system.

FIG. 9 shows a schematic of the R/W chip 58. The R/W chip 58 contains a bi-directional 16 bit synchronous serial port 350 that is coupled to the serial port 262 of the controller chip 56. The serial port 350 is coupled to a controller circuit 352 through line 354. The controller 352 is connected to a multiplexer 356 through line 358. The multiplexer 356 multiplexes the various lines of the heads in accordance with instructions received from the controller chip 56 through the serial port 350 and the controller circuit 352.

The R/W chip 58 has a data port 360 that is coupled to a detection circuit 362 through bus 364. The detection circuit 362 is coupled to the multiplexer 356 and controller circuit 352 by lines 366 and 368, respectively. The circuit 362 detects transitions in the voltage provided by the transducers and provides a digital output to the data port 360 through bus 364. The R/W chip 58 has a decoder 372 connected to the servo strobe circuit 272 of the controller chip 56. The decoder 372 is coupled to a servo burst circuit 374 through line 376. The decoder 372 enables the servo burst circuit 374 in response to pulses received from the servo strobe. The servo burst circuit 374 provides the servo signals A-B and C-D to the servo chip 60 on lines 250 and 252.

In the preferred embodiment, the R/W chip 58 is an integrated circuit similar to a product sold by Silicon Systems Inc. ("SSI") under the part designation 32P4730. The pre-amplifier chip is preferably a conventional integrated circuit sold by TI under the part designation TLV2234.

FIGS. 10a–g provide a flowchart of a typical operating sequence of the disk drive. In processing block 400 the host 112 has provided the disk drive with a request to write data to logical addresses A0–A63. The other condition is a head position at the end of a sector of the disk. In block 402 the data manager 62 stores the physical addresses and data from the host into the RAM buffer 132 and activates the HOSTINT interrupt signal. As the disk spins the servo field of a sector the approaches the head. In block 404, the search timer of the timer circuit 282 times out and provides the search signal and H sector signal to the burst demod circuit 274 and processor 260, respectively. The AGC circuit is also enabled to provide a control signal to the R/W chip 58 to initiate automatic gain control in block 406.

Along a parallel path the spin motor control circuit of the servo chip 60 generates a Vphase signal that is received by the spin circuit 336 of the controller chip 56 in block 408. The spin circuit 336 generates a SPININT interrupt signal for the processor 260 and initiates an internal timer in block 410. The spin circuit 336 also accesses the register file 266 to determine the time interval between the Vphase signal and the generation of the Vcomm signal. In block 412, the spin circuit 236 generates the Vcomm signal after the predetermined time interval.

From block 406 processing continues to block 414 where the burst demod circuit 274 reads raw data from the R/W chip 58 and enables the gray code circuit 270 upon the detection of the sync pulse. In block 416, the burst demod circuit 274 disables the gray code circuit 270 and enables the servo strobe circuit 272, which provides servo strobe pulses to the R/W chip 58. The R/W chip 58 provides the servo signals A-B and C-D to the servo chip 60 in block 418. The servo chip 60 converts the analog servo signals to digital data strings, which are transmitted to the controller chip 56 and stored in the register file 266 in blocks 418 and 420. The ID field of the servo burst is subsequently stored in the register file 266 in block 422.

In processing block 424, the processor 260 acknowledges the H sector interrupt signal. In decision block 426, the processor 260 determines whether the disk drive is in a seek routine. If the drive is in a seek routine, the processor reads the contents of the register file 266 which contain the gray code information, in processing block 428. In blocks 430–432, the processor 260 compares the gray code data with a desired track location, computes a seek current and generates a write command which is transmitted to the servo chip 60 through the serial ports 174 and 262. If the disk is in a servo routine the processor 260 reads the contents of the register file 266 which contain the servo burst information in processing block 434. The servo burst information is used to determine whether the heads 24 are on the centerline of the tracks and to calculate a voice coil correction command, in processing blocks 436–7. The processor 260 then generates a write command containing voice coil control data to the servo chip 60 through the serial ports in block 432. The digital voice coil control data is converted to analog signal by the Dac of the servo chip and provided to the voice coil to move the actuator arm and heads of the assembly.

In block 438, the processor 260 acknowledges the SPININT interrupt signal, if one exists. The processor 260 reads the processor internal timer and the Vcomm timer of the spin circuit 336 to compute the time interval between the Vphase signals in processing block 440 and adds the time interval to an accumulated time. In accordance with decision block 442, if the number of interrupts equals one revolution, a spin correction command is computed and the processor 260 generates a write command to the servo chip 60 through the serial ports in processing blocks 444 and 446. The spin correction command is calculated from the difference between a reference time and the accumulated time. The accumulative time is reset to zero in block 447. A new time interval value is also stored in the register file 266 for subsequent use by the spin circuit 336. The write command is transmitted to the servo chip which converts the digital string into analog signals which are provided to the spin motor control circuit. If the number of interrupts does not equal a revolution, the accumulative time is stored by the processor 260 in block 448.

In processing block 450, the processor 260 acknowledges the HOSTINT interrupt signal from the data manager 62. The processor 260 then retrieves the physical addresses from the buffer 232 within the data manager 62 and the ID field data in the register file 266 in processing block 452. In block 454, the processor 260 converts the logical addresses to actual sector locations. In accordance with decision block 456, if the heads 24 are not above the actual sector location, the processor 260 initiates a seek routine and generates a write command to the servo chip 60 to move the voice coil in processor block 458. The actuator arm is moved until the head is in the proper track. The processor 260 continually reads gray code until the actual sector location is adjacent to the head. In block 460, the processor 260 enables the Z sector circuit 292 which activates the Z sector pin after the servo field of the sector. The activation of the Z sector pin initiates a write of data from the data manager 62 to the R/W chip 58, which writes the data into the data field of the sector in processing block 462.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A servo integrated circuit chip that can be coupled to a controller chip that generates digital spin motor and digital voice coil motor commands to control a spin motor for rotating a disk and a voice coil motor for positioning an actuator arm assembly relative to the disk, said servo integrated circuit chip comprising:

a digital-to-analog converter circuit that converts the digital spin motor and digital voice coil motor commands from the controller chip to analog spin motor and analog voice coil motor control signals; and a spin motor control circuit that receives said analog spin motor control signal from said digital-to-analog converter circuit and controls the spin motor and thereby the rotational speed of the disk;

a voice coil motor control circuit that receives said analog voice coil motor control signal from said digital-to-analog converter circuit and controls the voice coil motor to control the position of the actuator arm assembly relative to the disk;

wherein said digital-to-analog converter circuit, said spin motor control circuit, and said voice coil motor control circuit are disposed on a common substrate within an integrated circuit package.

2. The servo integrated circuit chip as recited in claim 1, further comprising a serial port, disposed on said common substrate within said integrated circuit package, for serially receiving the digital spin motor and digital voice coil motor commands from the controller chip and providing the commands to said digital-to-analog converter circuit.

3. The servo integrated circuit chip as recited in claim 1, further comprising an analog-to-digital converter circuit disposed on said common substrate within said integrated circuit package and that converts analog feedback signals indicative of operation of one of the spin motor and the voice coil motor to digital feedback signals that are provided to the controller chip.

4. The servo integrated circuit chip as recited in claim 3, further comprising a serial port-disposed on said common substrate within said integrated circuit package, for receiving said digital feedback signals from said analog-to-digital converter circuit and for serially transmitting said digital feedback signals to the controller chip.

5. The servo integrated circuit chip as recited in claim 4, wherein said analog feedback signals include servo burst signals.

6. The servo integrated circuit chip as recited in claim 1, wherein said analog spin motor control signals include a spin motor track signal, a spin motor offset signal and a spin motor gain range signal that are provided to a summation circuit within said spin motor control circuit.

7. The servo integrated circuit chip as recited in claim 1, wherein said analog voice coil motor control signals include a voice coil motor track signal, a voice coil motor offset signal and a voice coil motor gain range signal that are provided to a summation circuit within said voice coil motor control circuit.

8. The servo integrated circuit chip as recited in claim 3, wherein said analog-to-digital converter circuit includes a serial approximation register that is connected to said digital-to-analog converter circuit and a comparator which has a first input connected to said digital-to-analog converter circuit and a second input that carries said analog feedback signals, wherein said serial approximation register generates a digital bit string that is converted to an analog input signal by said digital-to-analog converter circuit and said analog input signal is compared to said analog feedback signal by said comparator, said comparator having an output coupled to said serial approximation register and said serial approximation register having an output coupled to a serial port such that said serial port stores a digital bit string that corresponds to an amplitude of said analog feedback signal.

9. A servo integrated circuit chip that can be coupled to a controller chip that generates digital spin motor and digital voice coil motor commands to control a spin motor for rotating a disk and a voice coil motor for positioning an actuator arm assembly relative to the disk, said servo integrated circuit chip comprising:

digital-to-analog converter means for converting the digital spin motor and digital voice coil motor commands from the controller chip to analog spin motor and analog voice coil motor control signals;

spin motor control means for receiving said analog spin motor control signal from said digital-to-analog converter means and for controlling the spin motor and thereby the rotational speed of the disk;

voice coil motor control means for receiving said analog voice coil motor control signal from said digital-to-analog converter means and for controlling the voice coil motor to control the position of the actuator arm assembly relative to the disk; and wherein said digital-to-analog converter means, said spin motor control means, and said voice coil motor control means are disposed on a common substrate within an integrated circuit package.

10. The servo integrated circuit chip as recited in claim 9, further comprising serial port means, disposed on said common substrate within said integrated circuit package, for serially receiving the digital spin motor and digital voice coil motor commands from the controller chip and providing the commands to said digital-to-analog converter means.

11. The servo integrated circuit chip as recited in claim 9, further comprising analog-to-digital converter means, disposed on said common substrate within said integrated circuit package, for converting analog feedback signals indicative of operation of one of the spin motor and the voice coil motor to digital feedback signals that are provided to the controller chip.

12. The servo integrated circuit chip as recited in claim 11, further comprising serial port means, disposed on said common substrate within said integrated circuit package, for serially transmitting said digital feedback signals to the controller chip.

13. The servo integrated circuit chip as recited in claim 12, wherein said analog feedback signals include servo burst signals.

14. The servo integrated circuit chip as recited in claim 9, wherein said analog spin motor control signals include a spin motor track signal, a spin motor offset signal and a spin motor gain range signal that are provided to a summation circuit within said spin motor control means.

15. The servo integrated circuit chip as recited in claim 9, wherein said analog voice coil motor control signals include a voice coil motor track signal, a voice coil motor offset signal and a voice coil motor gain range signal that are provided to a summation circuit within said voice coil motor control means.

16. The servo integrated circuit chip as recited in claim 11, wherein said analog-to-digital converter means includes a serial approximation register that is connected to said digital-to-analog converter means and a comparator which has a first input connected to said digital-to-analog converter means and a second input that carries said analog feedback signals, wherein said serial approximation register generates a digital bit string that is converted to an analog input signal by said digital-to-analog converter means and said analog input signal is compared to said analog feedback signal by said comparator, said comparator having an output coupled to said serial approximation register and said serial approximation register having an output coupled to a serial port such that said serial port stores a digital bit string that corresponds to an amplitude of said analog feedback signal.

17. A disk drive electronic architecture that controls a spin motor for rotating a disk and a voice coil motor for positioning an actuator arm assembly relative to the disk, comprising:

a controller integrated circuit chip for outputting digital spin motor and digital voice coil motor commands to control the spin motor and the voice coil motor, respectively; and a servo integrated circuit chip coupled to said controller chip and comprising:

a digital-to-analog converter circuit that converts said digital spin motor and digital voice coil motor commands from said controller chip to analog spin motor and analog voice coil motor control signals, a spin motor control circuit that receives said analog spin motor control signal from said digital-to-analog converter circuit and controls the spin motor and thereby the rotational speed of the disk, and a voice coil motor control circuit that receives said analog voice coil motor control signal from said digital-to-analog converter circuit and controls the voice coil motor to control the position of the actuator arm assembly relative to the disk, wherein said digital-to-analog converter circuit, said spin motor control circuit, and said voice coil motor control circuit are disposed on a common substrate within a servo integrated circuit package.

18. The disk drive electronic architecture as recited in claim 17, further comprising a serial port, disposed on said common substrate within said servo integrated circuit package, for serially receiving said digital spin motor and digital voice coil motor commands from said controller chip and providing said digital spin motor and digital voice coil motor commands to said digital-to-analog converter circuit.

19. The disk drive electronic architecture as recited in claim 17, further comprising an analog-to-digital converter circuit, disposed on said common substrate within said servo integrated circuit package, that converts analog feedback signals indicative of operation of one of the spin motor and the voice coil motor to digital feedback signals that are provided to the controller chip.

20. The disk drive electronic architecture as recited in claim 19, further comprising a serial port, disposed on said common substrate within said integrated circuit package, for receiving said digital feedback signals from said analog-to-digital converter circuit and for serially transmitting said feedback signals to said controller chip.

21. The disk drive electronic architecture as recited in claim 20, wherein said analog feedback signals include servo burst signals.

22. The disk drive electronic architecture as recited in claim 17, wherein said analog spin motor control signals include a spin motor track signal, a spin motor offset signal and a spin motor gain range signal that are provided to a summation circuit within said spin motor control circuit.

23. The disk drive electronic architecture as recited in claim 17, wherein said analog voice coil motor control signals include a voice coil motor track signal, a voice coil motor offset signal and a voice coil motor gain range signal that are provided to a summation circuit within said voice coil motor control circuit.

24. The disk drive electronic architecture as recited in claim 19, wherein said analog-to-digital converter circuit includes a serial approximation register that is connected to said digital-to-analog converter circuit and a comparator which has a first input connected to said digital-to-analog converter circuit and a second input that carries said analog feedback signals, wherein said serial approximation register generates a digital bit string that is converted to an analog input signal by said digital-to-analog converter circuit and said analog input signal is compared to said analog feedback signal by said comparator, said comparator having an output coupled to said serial approximation register and said serial approximation register having an output coupled to a serial port such that said serial port stores a digital bit string that corresponds to an amplitude of said analog feedback signal.

25. The disk drive electronic architecture as recited in claim 17, further comprising:

a housing for enclosing the disk, said controller integrated circuit chip, and said servo integrated circuit chip;

wherein said controller integrated circuit chip and said servo integrated circuit chip are in substantially the same plane as the disk.

26. The disk drive electronic architecture as recited in claim 25, further comprising:

a printed circuit board to which said controller chip and said servo integrated circuit chip are mounted.

27. The disk drive electronic architecture as recited in claim 25, wherein:

said housing has a length of no more than about 85.6 millimeters and a width of no more than about 54 millimeters.

28. The disk drive electronic architecture as recited in claim 25, wherein:

said housing has a thickness of no more than about 10.5 millimeters.

29. The disk drive electronic architecture as recited in claim 25, wherein:

said housing has a thickness of no more than about 5 millimeters.

30. A disk drive electronic architecture that can control a spin motor for rotating a disk and a voice coil motor for positioning an actuator arm assembly relative to the disk, comprising:

controller means for outputting digital spin motor and digital voice coil motor commands that control the spin motor and the voice coil motor, and receiving digital feedback signals indicative of operation of one of the spin motor and the voice coil motor, wherein said controller means includes controller circuitry on a controller substrate within a controller integrated circuit package; and a servo integrated circuit chip coupled to said controller means and comprising:

digital-to-analog converter means for converting said digital spin motor and digital voice coil motor commands from said controller means to analog spin motor and analog voice coil motor control signals, spin motor control means for receiving said analog spin motor control signal from said digital-to-analog converter means and for controlling the spin motor and thereby the rotational speed of the disk, and voice coil motor control means for receiving said analog voice coil motor control signal from said digital-to-analog converter means and for controlling the voice coil motor to control the position of the actuator arm assembly relative to the disk, wherein said digital-to-analog converter means, said spin motor control means, and said voice coil motor control means are disposed on a common substrate within an integrated circuit package.

31. The disk drive electronic architecture as recited in claim 30, further comprising serial port means, disposed on said common substrate within said integrated circuit package, for serially receiving said digital spin motor and digital voice coil commands from the controller means and providing the commands to said digital-to-analog converter means.

32. The disk drive electronic architecture as recited in claim 30, further comprising analog-to-digital converter means, disposed on said common substrate within said integrated circuit package, for converting analog feedback signals indicative of operation of one of the spin motor and the voice coil motor to digital feedback signals that are provided to said controller means.

33. The disk drive electronic architecture as recited in claim 32, further comprising serial port means, disposed on said common substrate within said integrated circuit package, for serially transmitting said digital feedback signals to said controller means.

34. The disk drive electronic architecture as recited in claim 33, wherein said analog feedback signals include servo burst signals.

35. The disk drive electronic architecture as recited in claim 30, wherein said analog spin motor control signals include a spin motor track signal, a spin motor offset signal and a spin motor gain range signal that are provided to a summation circuit within said spin motor control means.

36. The disk drive electronic architecture as recited in claim 30, wherein said analog voice coil motor control signals include a voice coil motor track signal, a voice coil motor offset signal and a voice coil motor gain range signal that are provided to a summation circuit within said voice coil motor control means.

37. The disk drive electronic architecture as recited in claim 32, wherein said analog-to-digital converter means includes a serial approximation register that is connected to said digital-to-analog converter means and a comparator which has a first input connected to said digital-to-analog converter means and a second input that carries said analog feedback signals, wherein said serial approximation register generates a digital bit string that is converted to an analog input signal by said digital-to-analog converter means and said analog input signal is compared to said analog feedback signal by said comparator, said comparator having an output coupled to said serial approximation register and said serial approximation register having an output coupled to a serial port such that said serial port stores a digital bit string that corresponds to an amplitude of said analog feedback signal.

* * * * *